United States Patent
Fuhrmann et al.

(10) Patent No.: US 11,541,425 B2
(45) Date of Patent: Jan. 3, 2023

(54) SORTING METHOD FOR HOLLOW BODIES AND SORTING DEVICE

(71) Applicant: INTRAVIS GESELLSCHAFT FUR LIEFERUNGEN UND LEISTUNGEN VON BILDGEBENDEN UND BILDVERARBEITENDEN ANLAGEN UND VERFAHREN MBH, Aachen (DE)

(72) Inventors: Gerd Fuhrmann, Aachen (DE); Klaus Schönhoff, Würselen (DE); Michael Rick, Aachen (DE); Matthias Lenzen, Aachen (DE)

(73) Assignee: INTRAVIS GESELLSCHAFT FÜR LIEFERUNGEN UND LEISTUNGEN VON BILDGEBENDEN UND BILDVERARBEITENDEN ANLAGEN UND VERFAHREN MBH, Aachen (DE)

( * ) Notice: Subject to any disclaimer, the term of this patent is extended or adjusted under 35 U.S.C. 154(b) by 670 days.

(21) Appl. No.: 16/478,616

(22) PCT Filed: Jan. 4, 2018

(86) PCT No.: PCT/EP2018/050210
§ 371 (c)(1),
(2) Date: Jul. 17, 2019

(87) PCT Pub. No.: WO2018/134059
PCT Pub. Date: Jul. 26, 2018

(65) Prior Publication Data
US 2019/0366386 A1    Dec. 5, 2019

(30) Foreign Application Priority Data

Jan. 18, 2017  (DE) .................... 10 2017 100 901.9

(51) Int. Cl.
*B07B 13/00* (2006.01)
*B07B 13/05* (2006.01)
(Continued)

(52) U.S. Cl.
CPC ............ *B07B 13/003* (2013.01); *B07B 13/05* (2013.01); *B65G 47/256* (2013.01);
(Continued)

(58) Field of Classification Search
CPC ...... B65G 47/256; B07B 13/003; B07B 13/05
See application file for complete search history.

(56) References Cited

U.S. PATENT DOCUMENTS 3,033,337 A * 5/1962 Haidegger ........... B65G 47/256
                                                       221/163
3,392,816 A * 7/1968 Cox .................... B65G 47/1457
                                                       198/398
(Continued)

FOREIGN PATENT DOCUMENTS

CH      702396 A2     6/2011
DE     4406511 A1     9/1994
(Continued)

*Primary Examiner* — William R Harp
(74) *Attorney, Agent, or Firm* — Lucas & Mercanti, LLP

(57) ABSTRACT

Hollow bodies which are closed on one side and which are cylindrical are sorted by a sorting device. The hollow bodies have an end-side opening, a base surface situated opposite the opening and a shell surface extending between the base surface and the opening. The sorting device includes first nozzles arranged on an upper guide for conducting a first fluid flow in the direction of a lateral guide, and second nozzles arranged on a lower guide for conducting a second fluid flow in the direction of an outlet. Since the force of the fluid flow is several times greater if the fluid flow strikes a part of the shell surface of the hollow body through the end-side opening of the hollow body than if the fluid flow (Continued)

strikes the base surface of the hollow body from the outside, sorting of the hollow bodies is made possible.

22 Claims, 2 Drawing Sheets

(51) Int. Cl.
*B65G 47/256* (2006.01)
*B65G 47/52* (2006.01)

(52) U.S. Cl.
CPC .... *B65G 47/525* (2013.01); *B65G 2201/0214* (2013.01); *B65G 2203/044* (2013.01)

(56) References Cited

U.S. PATENT DOCUMENTS

| | | | |
|---|---|---|---|
| 5,513,739 | A | 5/1996 | Berg |
| 10,207,835 | B2 | 2/2019 | Wilhelm et al. |

FOREIGN PATENT DOCUMENTS

| | | |
|---|---|---|
| DE | 10052062 A1 | 9/2001 |
| DE | 10341481 A1 | 4/2005 |
| DE | 102006039091 A1 | 2/2008 |
| DE | 102007004418 A1 | 7/2008 |
| EP | 1120368 A1 | 8/2001 |

\* cited by examiner

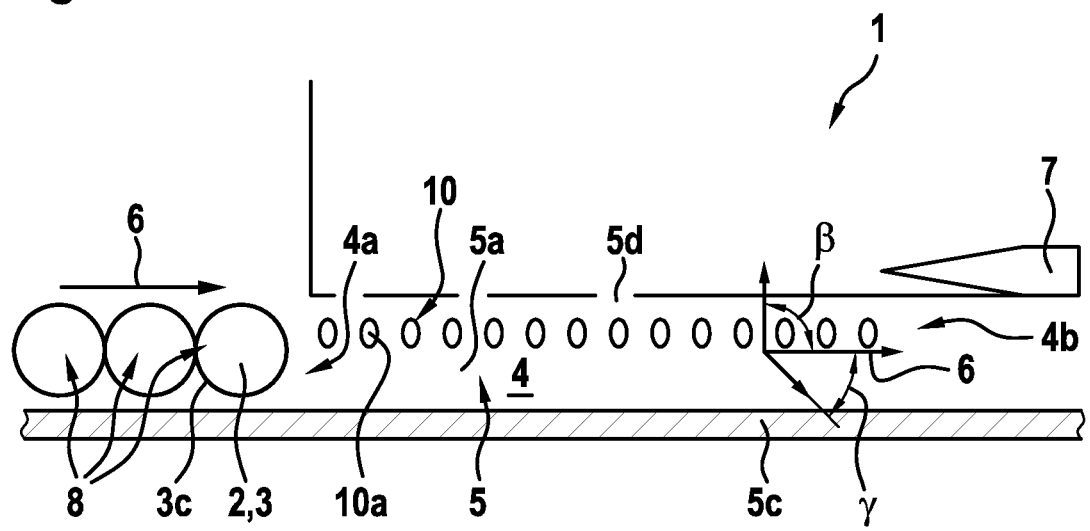
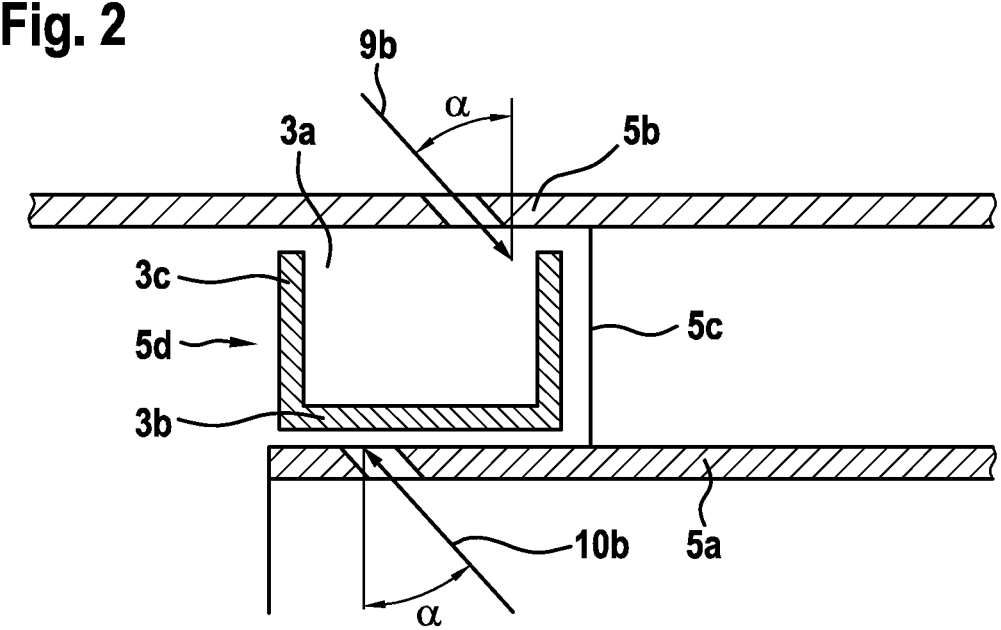

SORTING METHOD FOR HOLLOW BODIES AND SORTING DEVICE

CROSS-REFERENCE TO RELATED APPLICATIONS

This application is a 371 of PCT/EP2018/050210 filed Jan. 4, 2018, which in turn claims the priority of DE 10 2017 100 901.9 filed Jan. 18, 2017, the priority of both applications is hereby claimed and both applications are incorporated herein by reference.

BACKGROUND OF THE INVENTION

The invention relates to a method and to a device for sorting hollow bodies which are closed on one side and which are in particular cylindrical and which have an end-side opening, a base face that is opposite the opening, and a shell face that extends between the base face and the opening.

Methods and devices of the type mentioned are in particular used for sorting container closures which are in most instances composed of plastics material or non-magnetic metals.

For method steps that are downstream of production, for example for the visual testing of hollow bodies in a testing device, it is necessary for all of the hollow bodies to be supplied to the downstream method step in a positionally correct manner, that is to say so as to be in the same orientation. Depending on the specific application, the correct orientation of the hollow bodies is present when either the end-side opening of said hollow bodies or the base face of said hollow bodies that is opposite the opening points in the direction of a predefined transportation plane. Hollow bodies having the defective orientation by way of the opening or base face, respectively, point in a direction that is counter to the predefined direction.

A sorting apparatus which by virtue of the asymmetrical position of the center of gravity sorts container closures according to the orientation of the latter is known from DE 100 52 062 A1. The sorting apparatus configured as a steep conveyor is composed of a linear conveyor having a horizontal loading part and of a steep conveyor part which in relation to the horizontal is inclined at an angle of approximately 70-85 degrees. The linear conveyor is formed by a conveyor belt which at spacings orthogonal to the conveying direction is provided with dogs, the mutual spacings of the latter being larger than the largest diameter of the container closures destined for sorting. The height of the dogs is adapted to the shape of the container closures and is somewhat larger than the spacing of the center of gravity of said container closures from the conveyor belt. The ejection of the container closures having the defective orientation is performed in the steep conveyor part, said container closures being those of which the base lies so as to face away from the surface of the conveyor belt. The position of the center of gravity of the container closures having the defective orientation becomes unstable in the steep conveyor part, on account of which said container closures are ejected. A transfer installation is provided at the upper end of the steep conveyor section of the linear conveyor. Said transfer installation is either composed of a motor-driven ejection-slide device by way of which the container closures having the correct orientation, upon the conveyor coming to a stop, are conveyed in one or a plurality of rows into a conveying channel or into a collective guide that is upstream of said conveying channel, from where the container closures in a non-modified arrangement can be supplied to a downstream method step. In the case of comparatively high outputs of the closure elements, the transfer is typically performed in multiple tracks. The closure elements directed out in multiple tracks subsequently have to be converged to a single track again, since the downstream method steps and machines typically only permit single-track infeeding. Depending on the downstream method step, in particular in the case of folding or slitting processes of closure elements, a flawless sorting result is expected in order to avoid disruptions and stoppages resulting therefrom, and optionally repairs to the machines required for carrying out the processes.

DE 103 41 481 A1 describes a comparable sorter for bottle closures, having a trough which receives the bottle closures in a non-sorted manner, having a belt conveyor which stands obliquely and reaches into the trough and which is provided with transverse ribs of such a depth that only those bottle closures which by way of the base thereof point toward the belt conveyor are conveyed upward by virtue of the position of the center of gravity of said bottle closures. An accumulator device for accumulating and singularizing the bottle closures that are correctly oriented for further use adjoins the belt conveyor in the upper region, wherein the accumulator device is formed from a chute which is composed substantially of two plates that are disposed at a mutual parallel spacing, wherein the spacing corresponds approximately to the depth of the bottle closures. On account thereof, it is guaranteed that the bottle closures are maintained in the correct orientation in the accumulator device.

In the case of the known sorting installations there is the risk of hollow bodies having the correct orientation tilting and being sorted out on account thereof, which compromises the sorting output. The sorting out of hollow bodies having the correct orientation can arise, for example, from shocks of the conveyor belt, in particular at high belt speeds.

Apart from gravity, further forces as a result of electrostatic charging act on the hollow bodies. The electrostatic charge depends inter alia on the material, the number of revolutions of the individual hollow body in the sorting installation, as well as the air humidity. The electrostatic charge can lead to variations in the quality of the sorting. Therefore, continual readjusting of the sorting installation is required in order for such variations to be equalized.

Furthermore, numerous downstream processing steps and machines require dissimilar sorting and output performances. Adapting the speed of the conveyor belt is however problematic in the case of the known sorters because a higher speed can unfavorably influence the quality of the sorting.

A further problem of the known sorters lies in that numerous modern closure elements, caused by material savings on the base faces and/or the required strength of the tamper-evident band, no longer have an obviously asymmetrical position of the center of gravity. As a result, closures of this type are unlikely to be capable of being reliably sorted by way of the known sorting installations.

Post-sorting is a mandatory requirement in the case of downstream method steps having high requirements in terms of the quality of the sorting, in particular in the case of processes which do not tolerate any kind of hollow body having the defective orientation.

A method for continuously singularizing and aligning a multiplicity of cylindrical hollow bodies is furthermore known from CH 702 396 A2, said cylindrical hollow bodies under the effect of a fluid flow, in particular an air flow, being introduced into a conically tapering treatment space and along a guide face being brought into single-row mutual physical contact. The hollow bodies in the form of one row are subsequently discharged from the treatment space by way of an exit duct. The hollow bodies in the alignment thereof by the treatment space are at all times driven by the fluid flow and pushed against the guide face. However, it does occasionally arise that a hollow body is not integrated in the row but by way of the shell face of said hollow body bears on the hollow bodies lying in the row. Said hollow body is diverted by way of a slot in the exit duct. The hollow bodies make their way from the exit duct onto a transport belt which conveys the hollow bodies behind one another in a row to a testing installation in which the hollow bodies with the aid of one or a plurality of cameras are visually tested individually for faults and optionally for the correct orientation. Hollow bodies which are defective or have an incorrect orientation are removed from the row.

A device for supplying screw closures to a closing machine is known from DE 10 2006 039 091 A1, said device having a cross section that is adapted to the shape of the screw closures in such a manner that the screw closures by way of the closure axis thereof can be conveyed in this conveying duct in an alignment which is correct or defective, said alignment being predefined by the cross section of the conveying duct. The screw closures that are aligned in a defective manner do not have the orientation required for the further processing of said screw closures.

The device possesses means for diverting screw closures that are oriented in a defective manner from the conveying duct, wherein at least one sensor that detects the orientation of the screw closures, and following said sensor in the conveying direction, a diversion station which is actuated by an electronic control installation and which as a function of the sensor signal is activated for diverting a screw closure that is oriented in a defective manner, are provided on the conveying duct. The diversion station can have at least one nozzle for a controlled delivery of a pressurized vaporous and/or gaseous medium for blowing out screw closures that are oriented in a defective manner.

DE 44 06 511 A1 discloses a method in which objects, for example closure plugs, are conveyed from a magazine along a conveying path to a catching position in which all of the objects are positioned in a correct alignment. The objects are fed to the conveying path and directed to a mechanical barrier which is disposed at the entry of the conveying path and which is configured as a passage in the conveying path. The passage has a cross-sectional shape and size which is substantially congruent with the cross-sectional shape and size of the object. In this way, a correctly positioned object can pass the passage of the conveying path while objects which are incorrectly positioned at the inlet of the conveying path and at the barrier are temporarily raised by compressed-air impulses in order to make space for correctly positioned objects.

BRIEF SUMMARY OF THE INVENTION

An object of the present invention is to provide an operationally reliable method for sorting hollow bodies, and flawlessly separating the hollow bodies into such hollow bodies having the correct orientation and those having the defective orientation in a manner largely independent of the speed of the conveyed flow of the hollow bodies. A sorting device for carrying out the method is furthermore to be specified.

The achievement of the object utilizes the effect that a fluid flow acting on each hollow body exerts dissimilar forces on the hollow body, depending on which location the fluid flow impacts the hollow body. The force of the fluid flow is greater by a multiple when the fluid flow through the end side opening of the hollow body impacts part of the shell face of the hollow body than when the fluid flow impacts the base face of the hollow body from the outside.

The method according to the invention presumes that the hollow bodies in a row in the sorting section either by way of the base face or by way of the end-side opening point in the direction of the lower guide. The base face or the end-side opening herein bear on the lower guide that forms a transportation plane, and/or slide on a fluid bed along the sorting section, said fluid bed being configured by the fluid flow on the lower guide. A position of the hollow bodies of this type is guaranteed, for example, by a device according to CH 702 396 A2.

The correct orientation of the hollow bodies depends on the specific application. In as far as the hollow bodies in the case of the correct orientation by way of the base face point in the direction of the lower guide, the first fluid flow is directed through the upper guide and the second fluid flow is directed through the lower guide. In as far as the end-side openings in the case of the correct orientation point in the direction of the lower guide, the first fluid flow by contrast is directed through the lower guide and the second fluid flow is directed through the upper guide.

The lower guide that forms the transportation plane does not mandatorily have to be disposed horizontally but can form an incline. The upper flat guide that in relation to the lower guide is disposed thereabove, is preferably disposed so as to be parallel to the lower guide. The lower and the upper guide in terms of construction are embodied as plates, for example. However, rod assemblies or frame constructions that define the transportation plane can also be considered.

The first fluid flow in the direction of the lateral guide of the sorting section is aligned in such a manner, in particular with the aid of nozzles, that the first fluid flow either impacts the base face of each hollow body from the outside, or through the end-side opening impacts a part of the shell face of each hollow body that bears on the lateral guide. The first fluid flow in the case of the correct orientation of the hollow body therefore has the effect that said hollow body is pushed against the lateral guide and is conveyed along the sorting section.

The lateral guide can guide the shell face of the hollow bodies in a linear or planar manner. At least one fluid exit in the region of the lateral guide prevents that the first fluid flow backs up between the upper and lower guide, provided these are embodied as closed structures, for example as plates. In constructive terms, the lateral guide can have, for example, a guide plate, guide rods, guide strips, or tensioning means such as wires or cables as guide means.

The second fluid flow in the direction of the outlet of the sorting section is aligned in such a manner, in particular with the aid of nozzles, that the second fluid flow either impacts the base face of each hollow body from the outside, or through the end-side opening impacts a part of the shell face of each hollow body that points in the direction of the outlet. The second fluid flow in the case of the defective orientation of the hollow body therefore has the effect that said hollow body by the fluid flow is displaced by the fluid flow in the direction of the outlet.

Those hollow bodies having the defective orientation, the part of the shell face of said hollow bodies pointing in the direction of the outlet being impacted by the second fluid flow, are diverted by way of the outlet.

Summarizing, the hollow bodies having the correct orientation preferably pass through the sorting section in a rectilinear manner, while the hollow bodies having the defective orientation are sorted out in the direction of the outlet in a manner substantially orthogonal to the conveying device.

Should a back-up of the hollow bodies having the correct orientation arise in the outlet, correctly oriented hollow bodies in the sorting section can also deviate in the direction of the outlet. As a result of this effect, the method according to the invention and the device for carrying out the method can tolerate a backlog on the outlet side. No great pressure is exerted on the row of hollow bodies, this being advantageous in terms of following processes and devices in which the singularization of the hollow bodies is required, such as when printing or drifting, for example.

The first and the second fluid flow are preferably gas flows which are in particular generated by a single common blower. Actuators such as, for example, actuator valves or slides, are provided for setting the parameters of the first and/or the second fluid flow in a mutually independent manner, that is to say the volumetric flow and the positive pressure. Alternatively, the parameters of the first and the second fluid flow can be set in a mutually independent manner by way of separate blowers for generating the first and the second fluid flow. In order for the parameters to be set, the output of the blower for the first and the second fluid flow can be individually adapted and/or actuators can be assigned to each blower.

The determining of the aforementioned parameters of the first and the second fluid flow is performed in such a manner that

- the force that in the direction of the outlet acts on one of the hollow bodies by virtue of the second fluid flow impacting the shell face is greater than the force that in the direction of the lateral guide acts on said hollow body by virtue of the first fluid flow impacting the base face of the hollow body, or
- the force that in the direction of the lateral guide acts on one of the hollow bodies by virtue of the first fluid flow impacting the shell face is greater than the force that in the direction of the outlet acts on said hollow body by virtue of the second fluid flow impacting the base face of said hollow body.

In as far as the lower guide is not disposed horizontally but as an incline, the component of the weight force of the hollow body, said component being directed downward on the incline, additionally acts on each hollow body in the direction of the outlet or in the direction of the lateral guide.

This component of the weight force is optionally to be taken into account when determining the parameter of the first and the second fluid flow.

In order for the single-row conveying of the hollow bodies be maintained, the first and/or the second fluid flow preferably have/has a vector in the conveying direction.

The aligning of the first and/or the second fluid flow is preferably performed with the aid of a plurality of nozzles that along the sorting section are disposed on the upper and the lower guide. The nozzles can be particularly advantageously integrated in the guide when the upper and the lower guide are embodied as upper and lower plates, and the nozzles are embodied as first and second passages in the plates. The fluid flow is imparted a vector in the conveying direction when the first passages for aligning the first fluid flow in the upper or the lower plate, while conjointly with the conveying direction enclosing an acute angle and while in relation to a plumb line enclosing an acute angle, run on the lower or the upper plate. The second passages for aligning the second fluid flow, while conjointly with the conveying direction enclosing an acute angle and while in relation to a plumb line enclosing an acute angle, run on the upper or the lower plate.

In as far as the lower guide is embodied as a plate, the passages for configuring the nozzles are disposed in the plate in such a manner that, when conveying the hollow bodies in the conveying direction, any potential sprue point of the hollow body does not slide across the peripheries of the passages and can catch thereon.

A separating insulation which transfers the hollow bodies that are conveyed through the sorting section back into a single-row conveyed flow can be situated at the end of the sorting section, said single-row conveyed flow behind the sorting section preferably being guided on all sides again.

In one design embodiment of the method according to the invention the diverted hollow bodies having the defective orientation are reversed to the correct desired orientation, and in the conveying direction behind the sorting section, subsequently are again converged with the hollow bodies that have the correct orientation so as to form a common, in particular single-row, conveyed flow. On account of this method management, a multiple passage of hollow bodies having the defective orientation through the sorting section is not required.

In terms of the further processing of the hollow bodies in downstream method steps such as, for example, the testing and optionally sorting in optical inspection systems, it is advantageous when the hollow bodies are in mutual contact on the shell faces when conveyed in a single row.

BRIEF DESCRIPTION OF THE DRAWINGS

The invention will be explained in more detail hereunder by means of the figures in which:

FIG. 1 shows a schematic plan view of a device for carrying out the sorting method according to the invention;

FIG. 2 shows a section through a sorting section of the device as per FIG. 1;

DETAILED DESCRIPTION OF THE PREFERRED EMBODIMENTS

Figure 3:
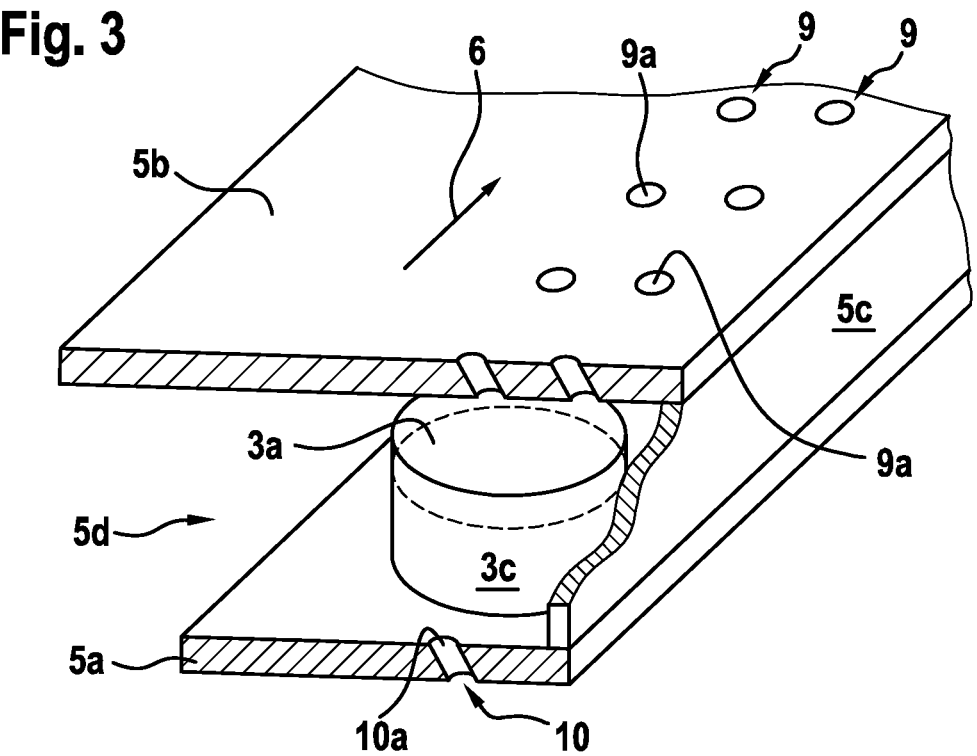
FIG. 3 shows a schematic, partially perspective, view of a device as per FIG. 1.

FIG. 1 shows a schematic plan view of a device (1) for sorting cylindrical hollow bodies in the form of closure caps (3) which are closed on one side, having an end-side opening (3*a*), a base face (3*b*) that is opposite the end-side opening (3*a*), and a shell face (3*c*) that extends between the base face (3*b*) and the opening (3*a*) (cf. FIG. 2).

The device (1) comprises a sorting section (4) having an inlet (4*a*) and an outlet (4*b*) having a guide (5), open at one side, for the single-row conveying of the closure caps (3) in a conveying direction (6) along the sorting section (4). The guide (5) is formed by a lower plate (5*a*), a upper plate (5*b*) which at parallel spacing is opposite the lower plate (5*a*), and a lateral guide (5*c*) which extends between the upper and the lower plate (5*a*, 5*b*). A separating installation (7) is situated at the end of the sorting section (4) which transfers the conveyed flow of the closure caps, said conveyed flow being in multiple tracks at the end of the sorting section (4), to a single-track conveyed flow. An outlet (5d) by way of which sorted-out closure caps (3) can be diverted is opposite the lateral guide (5c).

A single-row conveyed flow (8) is supplied to the sorting section (4) by way of the inlet (4a). The shell faces (3c) of the closure caps (3) in the single-row conveyed flow preferably are in mutual physical contact such that said closure caps (3) are supplied in a seamless manner. The supply can take place by means of a pre-sorter, for example, or driven by a fluid flow, for example an air flow, that is effective in the conveying direction (6). All of the closure caps (3) are supplied to the sorting section (4) in such a manner that the closure caps (3) either by way of the base face (3b) or by way of the end-side opening (3a) point in the direction of the lower plate (5a) of the guide (5).

The closure caps (3) in the exemplary embodiment illustrated have a correct orientation when the base face (3b) points in the direction of the lower plate (5a), as can be seen in particular in FIG. 2. By contrast, those closure caps of which the end-side opening (3a) point in the direction of the lower plate (5a) have to be sorted out on the path of said closure caps along the sorting section (4) and have to be diverted by way of the outlet (5d).

For this sorting process, two rows having first nozzles (9) are disposed on the upper plate (5b), said first nozzles (9) in the direction of the lateral guide (5c) being aligned in such a manner that a first gas flow (9b) impacts the base face (3b) of each closure cap situated in the sorting section from the outside, or through the end-side opening (3a) impacts a part of the shell face (3c) of each closure cap (3) that bears on the lateral guide (5c). As can be seen from FIG. 3, the nozzle rows are disposed so as to be parallel to the conveying direction (6). The passages (9a) that form the nozzles (9) in the upper plate (Sb), conjointly with the conveying direction (6), form an acute angle γ, on the one hand, and in relation to a plumb line on the upper plate form an acute angle α, on account of which the first fluid flow (9b) through the upper plate (5b) impacts the part of the shell face (3c) of each closure cap (3) that bears on the lateral guide (5c) and in the direction of the lateral guide (5c) impinges said shell face (3c) with a flow vector in the conveying direction (6). On account thereof, the closure caps (3) having the correct orientation are conveyed in the conveying direction (6) along the lateral guide (5c) in the direction of the outlet (4b) of the sorting section (4).

A single further row of nozzles (10) which likewise runs so as to be parallel to the conveying direction (6) is situated on the lower plate (5a). The passages (10a) that form the nozzles (10) in the lower plate (5a), while conjointly with the conveying direction (6) enclosing the right angle 3 illustrated in FIG. 1, and while in relation to a plumb line on the lower plate (Sa) enclosing an acute angle α, run in such a manner that the second fluid flow (10b) either impacts the base face (3b) of the closure caps having the correct orientation from the outside, or impacts a part of the shell face (3c) of the closure cap having the defective orientation that points in the direction of the outlet (5d).

The upper and the lower plate (5a, 5b) have in each case a thickness of approximately 5 mm. The first and the second passages (9a, 10a) possess a diameter of approximately 4-6 mm. The length of the sorting section is approximately 200 mm, this corresponding to approximately seven times the diameter of the closure caps (3). The spacing of the passages in the lower and the upper plate (5a, 5b) is approximately 15 mm. The acute angle α which the passages (9a, 10a) enclose in relation to a plumb line on the lower or the upper plate (5a, 5b), respectively, is approximately 45 degrees (cf. FIG. 2). The spacing between the upper and the lower plate (5a, 5b) is only slightly larger, for example by a factor of 1.1, than the height of the closure caps to be sorted, so as to reliably suppress any tilting of the closure caps during the sorting process.

The volumetric flow of the first fluid flow (9b) to the first passages (9a), and the volumetric flow of the second fluid flow (10b) to the second passages (10a), and the positive pressure of the first and the second fluid flow are approximately identical and are generated by a blower (not illustrated in the figures). The volumetric flow is, for example, 24 m³/min and is generated at a positive pressure of approximately 90 mbar.

The air management of the first and the second air flow above the upper and below the lower plate (5a, 5b) is performed, for example, by way of air-guiding ducts or air-guiding chambers, respectively, which in the conveying direction (6) extend above the upper plate (5b) and below the lower plate (5a) and from which the pressurized air passes through the first and the second passages (9a, 10a), respectively, in the direction of the closure caps.

The sorting effect of the afore-described device is based on an air flow having approximately identical parameters (pressure/volumetric flow) which, when the air flow through the end-side opening (3a) flows onto a part of the shell face (3c), exerts a force on the closure caps that is higher by a multiple than when the same air flow impacts the base face (3b) from the outside.

In as far as the closure caps (3) having the defective orientation are not ejected but, without modifying the position, are directed into a guide which is twisted by 180 degrees and is on all sides, so as to reverse the diverted closure caps having the defective orientation to the correct orientation, the closure caps having the defective orientation, without passing through the sorting section (4) again, in the flow direction behind the sorting section (4) can be converged in a common conveyed flow with the closure caps having the correct orientation, all of the closure caps (3) in said common conveyed flow having a correct orientation.

Figure 4:
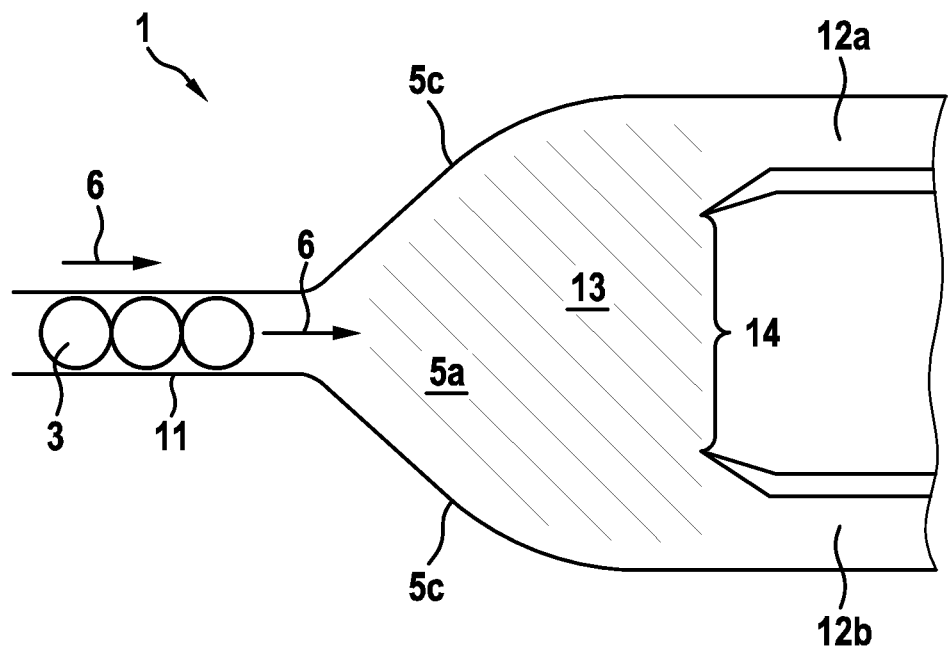
FIG. 4 shows a schematic plan view of a second exemplary embodiment of a device for carrying out the sorting method according to the invention.

FIG. 4 shows a further embodiment of a device (1)) for sorting, in which closure caps (3) having dissimilar orientations are incorporated in a sorting region (13) by way of a closed supply duct (11). The sorting region (13) is delimited by a lower plate (5a) and by an upper plate (5b) that is disposed at a parallel spacing from the former, and by lateral guides (5c) that, proceeding from the closed supply duct (11) connect the upper and the lower plate (5a, 5b) on both sides. The caps (3) either in a first orientation by way of the base face (3b) or in a second orientation by way of the end-side opening (3a) bear on the lower plate (5a).

A multiplicity of passages are disposed as nozzles in the lower plate (5a), a second fluid flow through the lower plate with the aid of said passages being aligned onto each closure cap (3) in such a manner that the second fluid flow impacts the base face (3b) of each closure cap (3) having the first orientation from the outside and through the end-side opening (3a) impacts a part of the shell face (3c) of the closure cap (3) on each closure cap having the second orientation.

In the same manner, an analogous number of passages are disposed as nozzles on the upper plate, a first fluid flow (9b) through the upper plate (5b) with the aid of said passages being aligned onto each closure cap (3) in such a manner that the first fluid flow (9b) impacts the base face (3b) of each closure cap (3) having the second orientation from the outside and through the end-side opening (3a) impacts a part of the shell face (3c) of the closure cap (3) of each closure cap (3) having the first orientation.

The force that acts on each closure cap (3) having the first orientation by virtue of the first fluid flow (9b) impacting the shell face (3c) of said closure cap (3) is greater than the force that acts on said closure cap by virtue of the second fluid flow impacting the base face (3b) of said closure cap. The force that acts on each closure cap (3) having the second orientation by virtue of the second fluid flow (10b) impacting the shell face (3c) of said closure cap (3) is greater than the force that acts on said closure By virtue of the first fluid flow impacting the base face (3b) of said closure cap.

The nozzles in the lower plate (5a) and the upper plate (5b) are incorporated and aligned in such a manner that the effective direction of the force that acts on the shell face (3c) of each closure cap having the first orientation deviates from the effective direction of the force that acts on the shell face of each closure cap having the second orientation in such a manner that the closure caps (3) having dissimilar orientations are displaced in dissimilar directions between the upper and the lower plate (5a, 5b). The closure caps (3) of the first orientation, for example, are displaced transversely to the conveying direction (6) in the direction of the lateral guide (5c) into an extension of a first discharge duct (12a), and the closure caps having the second orientation are displaced transversely to the conveying direction (6) in the direction of the lateral guide (5c) into an extension of a second discharge duct (12b). By virtue of the air flow that in the sorting region (13) is effective in the conveying direction (6), the closure caps of the first orientation, which are spatially separated from one another, make their way into the discharge duct (12a) and the closure caps of the second orientation, make their way into the discharge duct (12b).

An overflow (14) is disposed between the two discharge ducts (12a, 12b) in order to avoid any back-up of the mutually separated closure caps (3) of dissimilar orientations in front of the discharge duct (12a, 12b).

The discharge duct (12b) can be embodied as a guide, twisted by 180 degrees, for reversing the closure caps having the second orientation, so that the closure caps (3) which after the reversing operation are all present in the same orientation can subsequently be converged with the closure caps of the first orientation from the discharge duct (12a) in one common conveyed flow.

| No. | Reference sign |
|---|---|
| 1 | Device |
| 2 | Hollow body |
| 3 | Closure cap |
| 3a | Opening |
| 3b | Base face |
| 3c | Shell face |
| 4 | Sorting face |
| 4a | Inlet |
| 4b | Outlet |
| 5 | Guide |
| 5a | Lower plate |
| 5b | Upper plate |
| 5c | Lateral guide |
| 5d | Outlet |
| 6 | Conveying direction |
| 7 | Separating installation |
| 8 | Conveyed flow |
| 9 | First nozzle |
| 9a | First passage |
| 9b | First fluid flow |
| 10 | Second nozzle |
| 10a | Second passage |
| 10b | Second fluid flow |

-continued

| No. | Reference sign |
|---|---|
| 11 | Supply duct |
| 12a | $1^{st}$ discharge duct |
| 12b | $2^{nd}$ discharge duct |
| 13 | Sorting region |
| 14 | Overflow |

The invention claimed is:

1. A method for sorting hollow bodies that are closed on one side, the hollow bodies each having an end-side opening, a base face that is opposite the end-side opening, and a shell face that extends between the base face and the end-side opening, the method comprising the steps of:
conveying a row of the hollow bodies in a conveying direction in a single row along a sorting section of a sorting device, the sorting section having an inlet, an outlet, and a guide open at one side for guiding the hollow bodies in the conveying direction in the single row, the guide having a lower guide, an upper guide opposite the lower guide, a lateral guide disposed between the upper and the lower guide, and an outlet on the one side of the guide opposite the lateral guide and extending over a length of the lateral guide in the sorting section for diverting hollow bodies that are sorted out, wherein the base face or the end-side opening of the hollow bodies in the sorting section face the lower guide;
directing a first fluid flow through the upper guide and directing a second fluid flow through the lower guide, or directing the first fluid flow through the lower guide and directing the second fluid flow through the upper guide;
aligning the first fluid flow in the direction of the lateral guide such that the first fluid flow impacts the base face of each hollow body from the outside, or impacts through the end-side opening a part of the shell face of each hollow body that bears on the lateral guide;
aligning the second fluid flow in the direction of the outlet of the guide such that the second fluid flow impacts the base face of each hollow body from the outside, or impacts through the end-side opening a part of the shell face of each hollow body that faces the outlet,
wherein at least one of the first fluid flow and the second fluid flow has a vector in the conveying direction, and
at least one of the aligning of the first fluid flow and the aligning of the second fluid flow is performed using a nozzles disposed on the upper guide and the lower guide.

2. The method as claimed in claim 1, further comprising the step of:
diverting defectively oriented ones of the hollow bodies that have a defective orientation, the part of the shell face of the defectively oriented ones of the hollow bodies that faces the outlet of the guide being impacted by the second fluid flow.

3. The method as claimed in claim 2, wherein the hollow bodies that are diverted by way of the outlet are re-supplied to the sorting section.

4. The method as claimed in claim 2, wherein the defectively oriented hollow bodies that are diverted by way of the outlet are reversed to the correct orientation and, in the conveying direction behind the sorting section, subsequently are again converged with the hollow bodies that have the correct orientation so as to form a common conveyed flow.

5. The method as claimed in claim 1, further comprising the step of:
conveying in the conveying direction correctly oriented ones of hollow bodies that have a correct orientation up to the outlet of the sorting section, the part of the shell face of said hollow bodies that bears on the lateral guide being impacted by the first fluid flow.

6. The method as claimed in claim 1, further comprising the step of:
determining parameters of the first and the second fluid flow such that:
the force that in the direction of the outlet acts on one of the hollow bodies by the second fluid flow impacting the shell face is greater than the force that in the direction of the lateral guide acts on the one of the hollow bodies by the first fluid flow impacting the base face of the one of the hollow bodies, or
the force that in the direction of the lateral guide acts on one of the hollow bodies by the first fluid flow impacting the shell face is greater than the force that in the direction of the outlet acts on the one of the hollow bodies by the second fluid flow impacting the base face of the one of the hollow bodies.

7. The method as claimed in claim 1, wherein each of the first fluid flow and the second fluid flow is a gas flow.

8. The method as claimed in claim 1, the step of conveying the hollow bodies includes conveying the hollow bodies so that adjacent ones of the hollow bodies are in mutual physical contact.

9. A device for sorting hollow bodies that are closed on one side, the hollow bodies having an end-side opening, a base face opposite the end-side opening, and a shell face extending between the base face and the end-side opening, the device comprising:
a sorting section, specified for conveying a single row of the hollow bodies in a conveying direction along a sorting section, the sorting section having an inlet and an outlet, and having a guide open at one side,
wherein the guide has a lower guide, an upper guide opposite the lower guide, a lateral guide disposed between the upper and the lower guide, and an outlet extending over a length of the lateral guide on the one side of the guide, the one side being opposite the lateral guide for diverting hollow bodies that are sorted out,
a pump or a compressor for generating a first fluid flow and a second fluid flow,
first nozzles, disposed on one of the upper guide and the lower guide, for directing the first fluid flow therethrough, and second nozzles, disposed on an opposite one of the upper guide and the lower guide from the first nozzles, for directing the second fluid flow therethrough,
wherein the first nozzles in the direction of the lateral guide are aligned such that the first fluid flow impacts the base face of each hollow body from the outside, or impacts through the end-side opening a part of the shell face of each hollow body that bears on the lateral guide,
wherein the second nozzles in the direction of the outlet are aligned in such a manner that the second fluid flow impacts the base face of each hollow body from the outside, or impacts through the end-side opening a part of the shell face of each hollow body that faces the outlet,
wherein the lower guide and the upper guide are configured as an upper plate and a lower plate, and the first nozzles are embodied as first passages and the second nozzles are embodied as second passages, and
wherein the first passages extend in a first passage direction forming an acute angle with the conveying direction and forming another acute angle with a plumb line on one of the lower plate and the upper plate.

10. The device as claimed in claim 9, wherein the pump or the compressor for generating the first fluid flow and the second fluid flow is a single pump or a single compressor.

11. The device as claimed in claim 9, wherein the pump or the compressor is a blower generating a first gas flow and a second gas flow having a positive pressure of more than 80 mbar.

12. The device as claimed in claim 9, wherein a spacing between the upper guide and the lower guide is larger than one times a height of each of the hollow bodies but smaller than one-and-a-half times a height of the each of the hollow bodies.

13. The device as claimed in claim 9, wherein
the upper plate and the lower plate each have a thickness of at least 5 mm;
a diameter of the first passages and the second passages is between 4-6 mm; and
a length of the sorting section corresponds to 4 to 7 times a diameter of the hollow bodies.

14. The device as claimed in claim 9, wherein the second passages extend in a second passage direction forming a right angle with the conveying direction and forming an acute angle with a plum line on one of the upper plate and the lower plate.

15. The device as claimed in claim 14, wherein the first passages and the second passages are in each case disposed in at least one row along the sorting section.

16. The device as claimed in claim 9, wherein a gas flow that is active in the conveying direction conveys the hollow bodies along the sorting section.

17. A method for sorting hollow bodies that are closed on one side, the hollow bodies each having an end-side opening, a base face opposite the end-side opening, and a shell face extending between the base face and the end-side opening, the method comprising the steps of:
conveying the hollow bodies between a lower guide plane and an upper guide plane that is opposite the lower guide plane, wherein the hollow bodies are oriented in either a first orientation, in which the base face faces the lower guide plane, or a second orientation, in which the end-side opening faces the direction of the lower guide plane, wherein the hollow bodies between the upper and the lower guide are conveyed in a conveying direction by a fluid flow;
aligning a first fluid flow through the upper guide plane onto each hollow body in such a manner that the first fluid flow impacts from the outside the base face of each of the hollow bodies having the second orientation, and impacts through the end-side opening part of the shell face of the hollow body of each of the hollow bodies having the first orientation;
aligning a second fluid flow through the lower guide plane onto each hollow body in such a manner that the second fluid flow impacts from the outside the base face of the each of the hollow bodies having the first orientation, and impacts through the end side opening part of the shell face of the hollow body of the each of the hollow bodies having the second orientation, wherein
a force that acts on the each of the hollow bodies having the first orientation by virtue of the first fluid flow impacting the shell face of the each of the hollow bodies having the first orientation is greater than a force that acts on the each of the hollow bodies having the first orientation by virtue of the second fluid flow impacting the base face of the each of the hollow bodies having the first orientation;

a force that acts on the each of the hollow bodies having the second orientation by virtue of the second fluid flow impacting the shell face of the each of the hollow bodies having the second orientation is greater than a force that acts on the each of the hollow bodies having the second orientation by virtue of the first fluid flow impacting the base face of the each of the hollow bodies having the second orientation; and the effective direction of the force that acts on the shell face of the each of the hollow bodies having the first orientation deviates from the effective direction of the force that acts on the shell face of the each of the hollow bodies having the second orientation in such a manner that the hollow bodies having dissimilar orientations are displaced in dissimilar directions between the upper and the lower guide and, on account thereof, are spatially mutually separated, whereby due to the fluid flow effective in the conveying direction the each of the hollow bodies having the first orientation are conveyed into a first conveying channel and the each of the hollow bodies having the second orientation are conveyed into a second conveying channel, and wherein an overflow arranged between the first conveying channel and the second conveying channel avoids congestion of the hollow bodies in front of the first conveying channel and the second conveying channel.

18. The method as claimed in claim 17, further comprising the steps of:

transferring the hollow bodies in the first orientation to a first single-row conveyed flow and the hollow bodies in the second orientation to a second single-row conveyed flow;

reversing one of the first conveyed flow and the second conveyed flow such that all of the hollow bodies subsequently have the identical orientation in relation to the lower guide; and subsequently to the reversing, converging the first conveyed flow and the second conveyed flow.

19. The method as claimed in claim 18, wherein the reversing is performed with the aid of a guide twisted by 180°.

20. The method as claimed in claim 17, wherein the fluid flow is a gas flow.

21. The method as claimed in claim 17, wherein the steps of aligning of the first fluid flow and the second fluid flow are performed using a plurality of nozzles disposed on the upper guide plane and the lower guide plane.

22. The method as claimed in claim 17, wherein the upper guide plane and the lower guide plane are formed by plates in which the passages are incorporated as nozzles.

* * * * *